United States Patent [19]

Adachi

[11] 4,023,153
[45] May 10, 1977

[54] DEVICE FOR INDICATING ANY WIRE BREAKING IN PARALLEL CONNECTED PLURAL LOADS

[75] Inventor: Masahiro Adachi, Yokohama, Japan

[73] Assignee: Nissan Motor Co., Ltd., Japan

[22] Filed: Feb. 19, 1976

[21] Appl. No.: 659,361

[30] Foreign Application Priority Data

Feb. 26, 1975   Japan .............................. 50-22776

[52] U.S. Cl. .................................. 340/251; 315/83
[51] Int. Cl.² ............................................. G08B 21/00
[58] Field of Search ............. 340/251, 52 R, 81 R, 340/80, 79; 315/82, 83; 335/151, 152, 153, 154; 307/10 R, 10 LS

[56] References Cited

UNITED STATES PATENTS

| | | | |
|---|---|---|---|
| 3,171,096 | 2/1965 | Murray et al. | 340/251 X |
| 3,457,561 | 7/1969 | Zeisler | 340/251 |
| 3,629,799 | 12/1971 | Birtwistle | 340/251 X |
| 3,631,441 | 12/1971 | Murphy | 340/251 |
| 3,643,248 | 2/1972 | Schott | 340/251 X |
| 3,644,886 | 2/1972 | Sabaroff | 340/251 X |
| 3,753,224 | 8/1973 | Martin | 340/251 X |
| 3,789,232 | 1/1974 | Wareing | 340/251 X |
| 3,811,107 | 5/1974 | Sakurai | 340/251 X |
| 3,956,733 | 5/1976 | Sakurai | 340/251 X |
| 3,975,721 | 8/1976 | Franz | 340/251 |

Primary Examiner—John W. Caldwell
Assistant Examiner—Daniel Myer
Attorney, Agent, or Firm—Robert E. Burns; Emmanuel J. Lobato; Bruce L. Adams

[57] ABSTRACT

A device for detecting any failure in a plurality of loads connected in parallel with one another comprises an indicator lamp connected in series with first and second magnetically operable switching elements. A control circuit comprising first and second coils associated, respectively, with the first and second switching elements is connected in series between a DC power source and the parallel connected loads. A third coil associated with the first switching element and producing a magnetic field opposing that of the first coil is connected in series with a resistor across the power source. A zener diode in series with a resistance is connected in parallel with the third coil. The sensitivities of the first and second switching elements and the coil constants are adjusted so that the first switching element is opened only when the number of the load failures is between 1 and K−1, where K is an integer between 2 and n, while the second switching element is opened only when at least K loads fail on condition that the intensity of the composite magnetic field produced by the first and third coils is close to zero when the number of the load failures is K−1.

16 Claims, 9 Drawing Figures

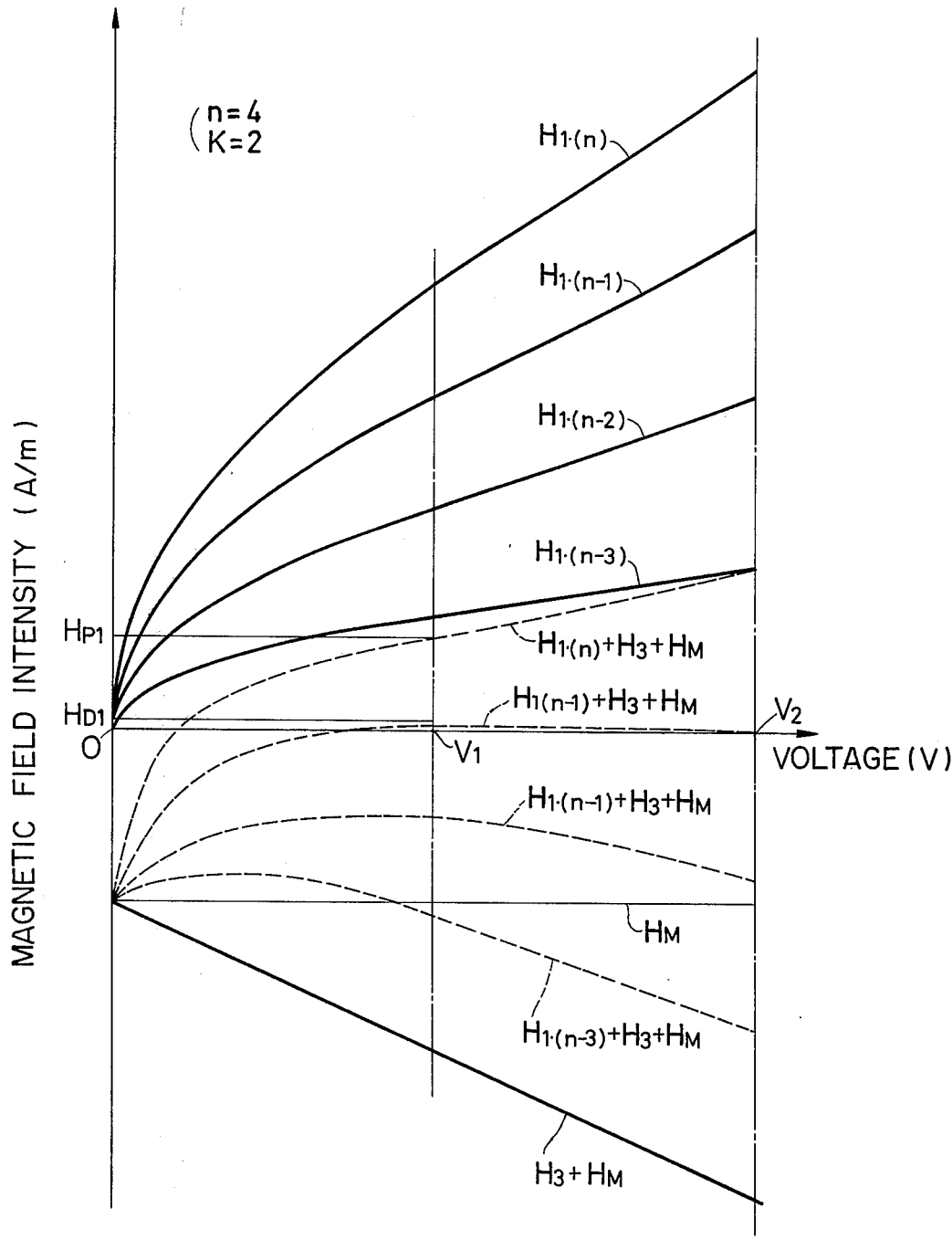

DEVICE FOR INDICATING ANY WIRE BREAKING IN PARALLEL CONNECTED PLURAL LOADS

This invention relates to a device for detecting and indicating the occurrence of any breaking of wire in a plurality of loads which are in parallel connection, and more particularly to a device of this type which is fully practicable even when a DC power source for the loads is relatively unstable in its output voltage as in the case of a power source in automobiles.

In general, it is not difficult to detect or monitor the occurrence of any breaking of wire in an electrical circuit which includes a plurality of loads such as resistors and/or coils in parallel connection even if it is a requisite for the monitoring operation to use no extra power source other than a power source in the circuit to be monitored. When, however, the power source of this circuit is rather unstable in its output voltage as in the case of an automotive lighting or instrumental circuit, it is not easy to produce a practicable and reliable monitoring device for accomplishing the aforementioned task.

It is a usual technique of detecting the occurrence of any breaking of wire in a circuit including a plurality of loads in parallel connection to use a relay which is actuated when the current flowing through the circuit decreases by a certain magnitude due to failure of any one of the loads. Let us assume that the circuit has two lamps in parallel connection and a DC power source of which output voltage fluctuates between the minimum value $V_1$ and the maximum $V_2$. When the two lamps are lighted at the minimum voltage $V_1$, the current flowing in the circuit provides a magnetic field of which intensity is represented by $H_{12}$. When one of the lamps is broken and the maximum voltage $V_2$ is impressed on the circuit, the intensity of the magnetic field changes to $H_{21}$. Then, the relay is required that a threshold magnetic field intensity $H_P$ for actuation is greater than $H_{12}$ while a threshold magnetic field intensity $H_D$ for releasing is below $H_{21}$.

Since scatterings in the resistances of commercially available lamps and changes in the relay characteristics during a prolonged use must be taken into consideration other than the fluctuation in the output voltage of the power source, the ratio $H_D/H_P$ is necessarily at least 8/10. It is very difficult, however, to produce a relay of such a high precision on an industrial scale. Even if a satisfactorily precise relay is obtained, there arises another problem that such a precise relay will become unstable in a short time when it is installed on an automobile, for example, and subjected to mechanical and environmental stresses.

It is an object of the present invention to provide an industrially practicable device for monitoring an electrical circuit including a DC power source and a plurality of loads in parallel connection and indicating the occurrence of any breaking of wire in the loads, which device can function reliably even when the power source exhibits a considerable fluctuation in its output voltage and is resistant to mechanical and environmental stresses as experienced in automobiles.

According to the invention, a monitoring device for detecting and indicating the occurrence of any breaking of wire in a plurality of loads, i.e., n pieces of loads, which are in parallel connection with each other and connectable to a DC power source, comprises: first and second coils which are magnetically isolated from one another and electrically interposed between the loads and the power source to produce respectively first and second magnetic fields when the loads are connected to the power source; and a third coil which is connected to the power source and arranged to produce a third magnetic field in the reverse direction to the first magnetic field when the loads are connected to the power source. The third coil is arranged to produce a composite magnetic field with the first magnetic field. The device further comprises an electrically actuatable indicator typified by a lamp, and a switching circuit for governing the supply of power to the indicator. This switching circuit includes first and second elements of the same type which are sensitive to variations in the intensity of a magnetic field around them. The first and second elements are arranged to lie respectively in the composite magnetic field and the second magnetic field when the loads are connected to the power source. The constants of the three coils and the sensitivities of the two elements in the switching circuit are regulated such that the first element is in a first state in regard to the completion of the switching circuit only when the loads are connected to the power source and the number of the broken loads is in the range between 1 and (K−1), where K is a predetermined integer between 2 and n, but in a second state when the number of the broken loads is either zero or at least K, while the second element is in the first state when the loads are connected to the power source and the number of the broken loads is at least K but in the second state when the number of the broken loads is less than K. The intensity of the composite magnetic field is adjusted to be close to zero when the number of the broken loads is K − 1. Consequently, the indicator is in one of the actuated and non-actuated states only when the number of the broken loads is zero and in the other state when at least one load is broken.

In the first aspect of the invention, the aforementioned switching circuit includes first and second normally open reed switches as the first and second elements. These reed switches may be connected either in series, on condition that the first and second coils are connected in series with one another, or in parallel on condition that the first and second coils are in parallel. The sensitivities of the reed switches and the intensities of the magnetic fields are adjusted to satisfy the following inequalities:

$$|H_{1(n)} + H_3| > H_{P1} > H_{D1} > |H_{1(n-1)} + H_3|$$
$$|H_{1(n-k)} + H_3| > H_{P1} > H_{D1} > |H_{1(n-1)} + H_3|$$
$$|H_{2(n)}| > H_{P2} > H_{D2} > |H_{2(n-k)}|$$

where $H_{P1}$ and $H_{P2}$ are the minimum magnetic field intensities for closing the first and second reed switches, respectively,
$H_{D1}$ and $H_{D2}$ are the maximum magnetic intensities for releasing the first and second reed switches, respectively,
$H_1$, $H_2$, and $H_3$ are intensities of the first, second and third magnetic fields, respectively, and
each subscript in each parenthesis represents a state where the number of the broken loads is as indicated in the parenthesis.

The intensities of the third magnetic field and, hence, the composite magnetic field can be adjusted by the use of either a zener diode or a magnet.

In the second aspect of the invention, two sets of either Hall effect devices or magnetoresistors are used as the aforementioned first and second elements in combination with an OR gate and a transistor switching circuit.

Other features and advantages of the invention will become apparent from the following detailed description of preferred embodiments with reference to the accompanying drawings, wherein:

FIG. 6 is a graph generally similar to FIG. 2 but with respect to the device modified as shown in FIG. 5;

Figure 1:
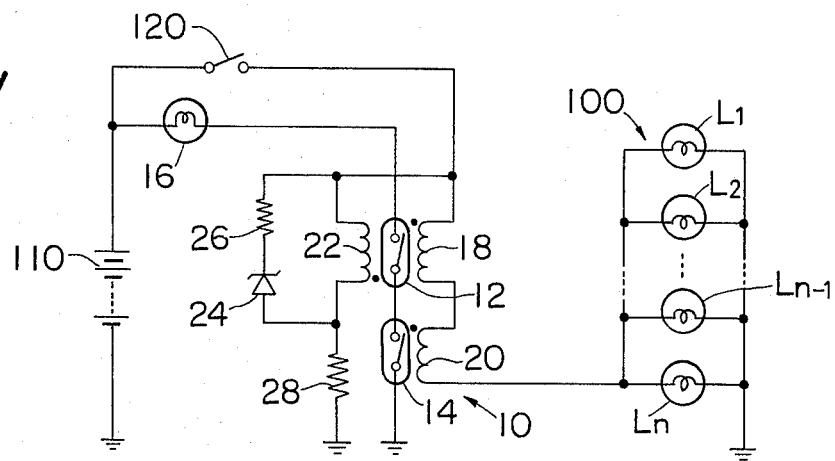
FIG. 1 is a circuit diagram of a monitoring device as a first embodiment of the invention in connection with a power source and a plurality of loads.

Referring to FIG. 1, a monitoring device 10 as a first preferred embodiment of the invention has two normally open reed relays or switches in series connection, namely, a first reed switch 12 and a second reed switch 14, and an indicator lamp 16 in series with these reed switches 12 and 14. First and second coils 18 and 20, which are connected in series with but magnetically isolated from one another, are arranged adjacent to and parallel with the reed switches 12 and 14 to produce magnetic fields for governing the states of these reed switches 12 and 14, respectively. The device 10 has another coil, i.e., a third coil 22 which is connected in series with a resistance 28 and is arranged adjacent the first reed switch 12 so as to govern the first reed switch 12 in collaboration with the first coil 18 and arranged to produce a magnetic field in the reverse direction to the magnetic field produced by the first coil 18. In addition, a zener diode 24 in series with a resistance 26 is connected in parallel with the coil 22. The device 10 is in connection with a circuit to be monitored which includes a DC power source 110, a switch 120 and a plurality of loads indicated generally at 100 and represented by n pieces of lamps $L_1$, $L_2$, . . . $L_{n-1}$, and $L_n$. These lamps 100 are connected in parallel with each other. The device 10 is connected with the power source 100 such that the load current to the lamps 100 flows through the series connected first and second coils 18 and 20. The circuit comprising the coil 22 in series with the resistance 28 and in parallel with the series connected zener diode 24 and resistance 26 is connected across the DC power source 110. Thus, the coils 18, 20 and 22 produce respectively three magnetic fields when the switch 120 is closed to connect the lamps 100 to the power source 110, and the intensities of these magnetic fields are variables depending on the number of broken lamps among the lamps 100.

This device 10 is designed such that the reed switches 12 and 14 are closed and cause lighting of the indicator lamp 16 when the switch 120 is closed and none of the lamps 100 is broken. The constants of the first and third coils 18 and 22 and the sensitivity of the first reed switch 12 are so determined as to open the first reed switch 12 only when a definite portion of the lamps 100, i.e., from 1 to (K−1) pieces in number, where K is an integer between 2 and n, is broken (Therefore, the first reed switch 12 remains in the closed state even if K or more pieces of lamps 100 are broken.) The second coil 20 has such a constant that the second reed switch 14 is opened only when K or more pieces of lamps 100 are broken. The relationships between the intensities of the magnetic fields produced by the coils 18, 20 and 22 and the sensitivities of the reed switches 12 and 14 for realizing such functions of the reed switches 12 and 14 will be described hereinafter with reference to the graphs of FIGS. 2–4.

Figure 2:
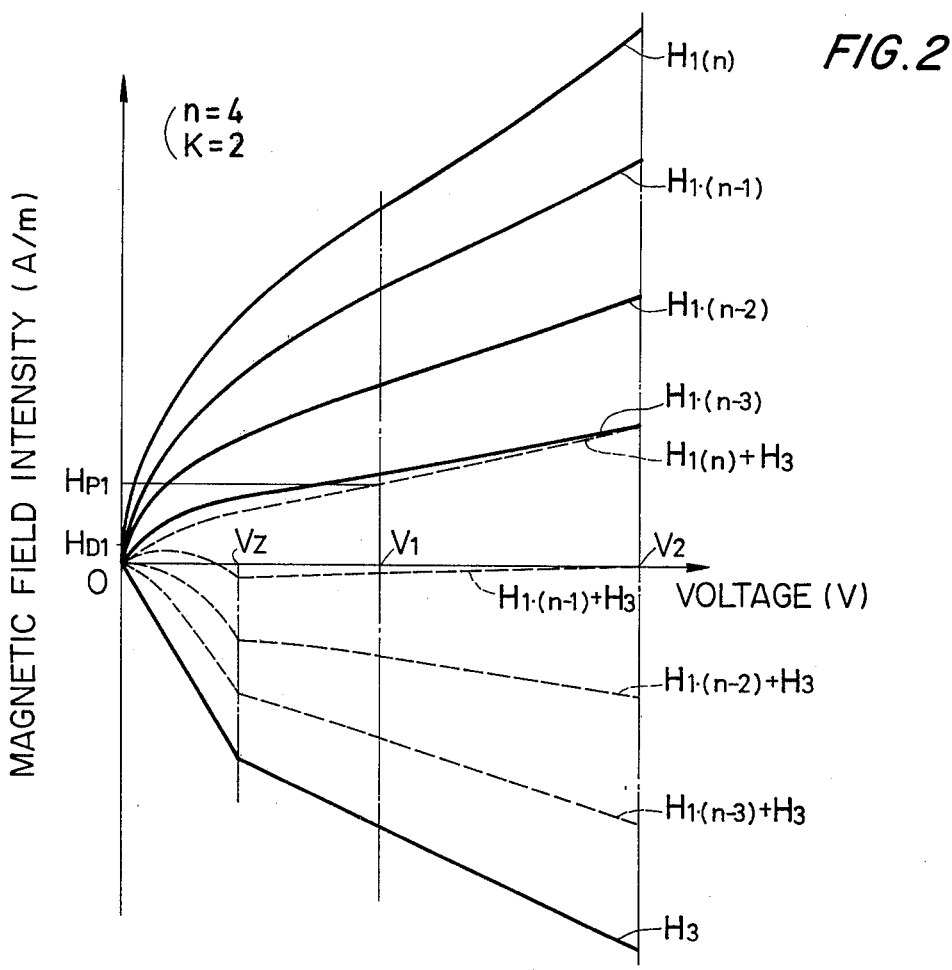
FIGS. 2–4 are graphs showing the relationships between the magnitude of the output voltage of the power source and the intensities of a plurality of magnetic fields produced by the three coils in the device of FIG. 1.

The graph of FIG. 2 is concerned with a case where the total number $n$ of the lamps 100 is 4 and the integer K is 2. This graph shows the variations in the intensities of the magnetic fields produced by the first and third coils 18 and 22 with variations in the magnitude of the voltage impressed on the lamps 100. The curves indicated at symbols $H_1$ and $H_3$ represent the magnetic fields produced by the first and third coils 18 and 22, respectively, and the subscripts $(n-3)$, $(n-2)$, $(n-1)$ and $(n)$ represent the number of the unbroken or lightable lamps 100. On the abscissa, $V_1$ and $V_2$ respectively represent the minimum and maximum voltages impressed on the lamps 100 from the fluctuating power source 110. The voltage $V_z$ (which is below the voltage $V_1$) represents the zener voltage of the zener diode 24.

In the device 10 of FIG. 1, the circuit including the zener diode 24 and the resistors 26 and 28 is provided to make the voltage-current characteristic of the third coil 22 similar to the voltage-current characteristic of the lamps 100. The magnetic field $H_3$ produced by the third coil 22, therefore, is in the reverse direction to the magnetic field $H_1$ by the first coil 18 but has a nearly equal intensity (in the absolute value) to the latter magnetic field $H_1$ at least over the voltage range between $V_1$ and $V_2$. The curves drawn by broken lines in the graph of FIG. 2 represent a composite magnetic field $H_1 + H_3$ resulting from the composition of the magnetic fields $H_1$ and $H_3$. On the ordinate, the magnetic field intensity indicated at $H_{P1}$ is the minimum intensity for actuating (closing) the first reed switch 12, and another intensity $H_{D1}$ is the maximum intensity for leaving the first reed switch 12 released or open.

In the case of FIG. 2($n = 4, k − 1 = 1$), the intensity of the magnetic field $H_3$ produced by the third coil 22 is adjusted such that the intensity of the composite magnetic field $H_{1(n-1)} = H_3$ (when one of the lamps 100 is broken) is nearly zero regardless of changes in the voltage impressed on the lamps 100 at least within the range between $V_1$ and $V_2$. As a result, the first reed switch 12 can be in the closed state except when only one of the lamps 100 is broken even though the first reed switch 12 is designed to cause the releasing magnetic field intensity $H_{D1}$ to be very low. The value of the actuating magnetic field intensity $H_{P1}$ for the first reed switch 12 can be settled with a considerable difference from the value of $H_{D1}$ since $H_{P1}$ is required only to be equal to or below the minimum value (in the absolute value) of the intensities of the composite magnetic fields $H_{1(n)} + H_3$, $H_{1(n-2)} + H_3$ and $H_{1(n-3)} + H_3$ within the voltage range from $V_1$ to $V_2$ so that the first reed switch 12 may be in the closed state except when the number of the broken lamps 100 is one. Thus, it is possible to make the ratio $H_{D1}/H_{P1}$ very small. In other words, the first reed switch 12 needs not to be of high precision.

The function of the second reed switch 14 in the case of $n = 4$ and $K = 2$ will be explained with reference to the graph of FIG. 3, in which the curves represent variations in the intensity of the magnetic field $H_2$ produced by the second coil 20, and the subscripts $(n-3)$, $(n-2)$, $(n-1)$ and $(n)$ represent the same as in FIG. 2.

Since the breaking of only one $(K-1)$ of the lamps 100 can be detected by means of the first reed switch 12, the second reed switch 14 is not necessarily in the open state when only one lamp is broken, but is required to be in the open state when two (K) or more lamps 100 are broken. Accordingly, the maximum value of the minimum actuating magnetic field intensity $H_{P2}$ for the second reed switch 14 is allowed to be equal to the value of $H_{2(n)}$ at the voltage of $V_1$. The minimum value of the maximum releasing magnetic field intensity $H_{D2}$ for the second reed switch 14 can be as large as the value of $H_{2(n-2)}$ at the voltage of $V_2$. As seen in FIG. 3, the sensitivity of the second reed switch 14 can be designed without taking into consideration the intensity of the magnetic field $H_{2(n-1)}$ which is produced when only one of the lamps 100 is broken. Consequently, the second reed switch 14 is allowed to have a considerably small value of the ratio $H_{D2}/H_{P2}$ likewise in the case of the first reed switch 12.

In the device 10 of FIG. 1, the power source 110, the first and second reed switches 12 and 14 and the lamps 100 are connected in series. The indicator lamp 16, therefore, is lighted only when both the first and second reed switches 12 and 14 are in the closed state. As described hereinbefore, the first reed switch 12 is in the open state if one of the lamps 100 is broken, while the second reed switch 14 is in the open state when two or more lamps are broken. Thus the device 10 of FIG. 1 can indicate the occurrence of any breaking in the lamps 100 by non-lighting of the indicator lamp 16.

The integer K was taken as 2 (hence, $K-1 = 1$) for simplicity in the foregoing description, but is not necessarily limited to 2. In other words, the first reed switch 12 may be allotted with a heavier task that the first reed switch 12 must be in the open state even when more than one lamp 100 is broken.

Figure 4:
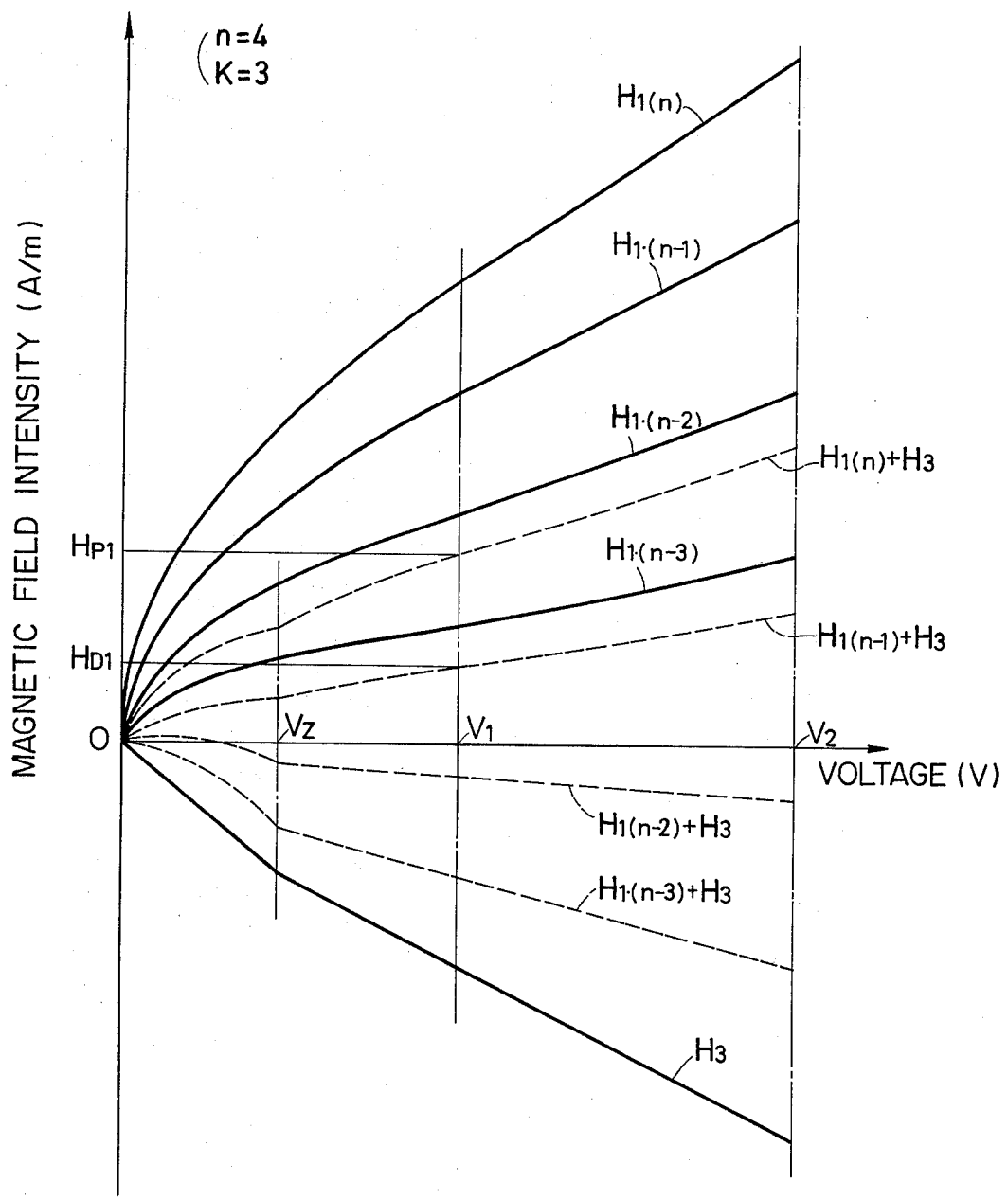

The graph of FIG. 4 is fundamentally similar to the graph of FIG. 2 except that the integer K is taken as 3 and that the intensity of the magnetic field $H_3$ produced by the third coil 22 is differently adjusted to make the intensity of the composite magnetic field $H_{1(n-2)} + H_3$ as close to zero as possible within the voltage range between $V_1$ and $V_2$. As seen from this graph, the value of $H_{D1}$ for the first reed switch 12 must be larger than the value in the case of $K = 2$. Although the value of $H_{P1}$ also can be increased in the case of FIG. 4, the increase is only by a smaller percentage than the increase in $H_{D1}$. Accordingly, the first reed switch 12 is required to exhibit the ratio $H_{D1}/H_{P1}$ of a larger value than in the case of $K = 2$. This means that the first reed switch 12 must be designed and constructed more precisely than in the case of $K = 2$.

When, however, the first reed switch 12 can be in the open state even if two lamps 100 are broken, the second reed switch 14 needs not be in the open state in case where two lamps 100 are broken. The second reed switch 14 is required to be in the open state only when three or more lamps 100 are broken. Referring again to FIG. 3, the value of $H_{D2}$ for the second reed switch 14 when K is 3 can be decreased to a value equal to the value of $H_{2(n-3)}$ at the voltage of $V_2$. Accordingly, the ratio $H_{D1}/H_{P1}$ for the second reed switch 14 at $K = 3$ decreases noticeably. Thus, the necessity for a higher acuracy with respect to the first reed switch 12 resulting from adopting a larger K value can be compensated for by the permission of reducing the acuracy of the second reed switch 14.

In general, the integer K with respect to the device 10 of FIG. 1 can be optionally selected within the range between 2 and n on condition that the intensity of the magnetic field $H_3$ produced by the third coil 22 is adjusted to satisfy the following three inequalities:

$$|H_{1(n)} + H_3| > H_{P1} > H_{D1} > |H_{1(n-1)} + H_3| \quad (1)$$
$$|H_{1(n-K)} + H_3| > H_{P1} > H_{D1} > |H_{1(n-1)} + H_3| \quad (2)$$
$$|H_{2(n)}| > H_{P2} > H_{D2} > |H_{2(n-K)}| \quad (3)$$

where $H_{1(n-k)}$ represents the intensity of the magnetic field produced by the first coil 18 when K pieces among n pieces of the lamps 100 are broken, and $H_{2(n-K)}$ represents the intensity of the magnetic field produced by the second coil 20 when K pieces of the lamps 100 are broken.

Figure 3:
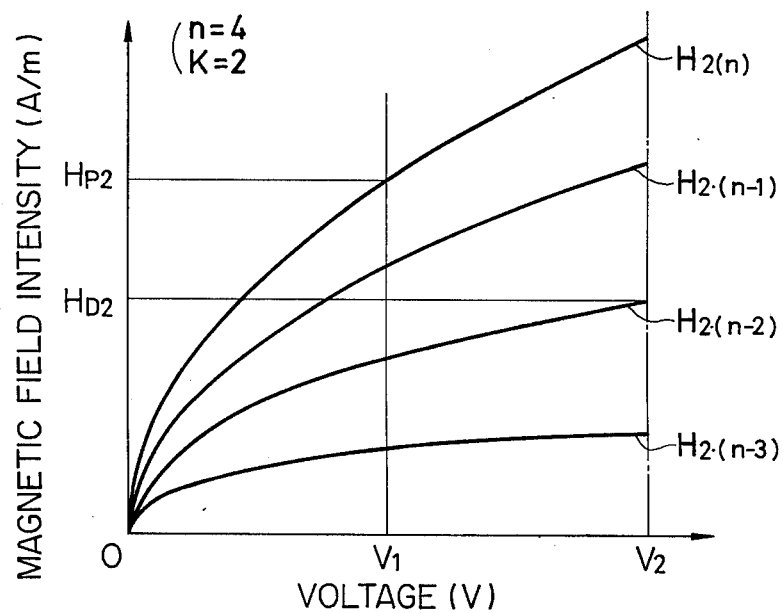

It will be understood with reference to FIGS. 3 and 4 that $H_{D1}$ needs to increase but $H_{D2}$ can be decreased as K is increased in the above inequalities.

The zener diode 24 and the resistors 26 and 28 in the device of FIG. 1 are employed to regulate the dependence of the intensity of the magnetic field $H_3$ on the voltage impressed on the third coil 225 but may be replaced by a different means. In a modified embodiment 10A as partly shown in FIG. 5, a permanent magnet 10 which provides a magnetic field of a constant intensity in the same direction as the third coil 22 is arranged close to the third coil 22. In other respects, the modified embodiment 10A is identical with the device 10 of FIG. 1. Referring to the graph of FIG. 6 wherein the intensity of the magnetic field produced by the permanent magnet 30 is indicated at $H_M$, it will be understood that a composite magnetic field $H_3 + H_M$ with respect to the device 10A of FIG. 2 corresponds to the magnetic field $H_3$ with respect to the device 10 of FIG. 1. This graph is fundamentally similar to the graph of FIG. 4 and shows the relationship between the actuating and releasing magnetic field intensities $H_{P1}$ and $H_{D1}$ for the first reed switch 12 in the case where the total number n of the lamps 100 is 4 and the integer K is taken as 2. In the device 10A, the integer K may be taken optionally in the range from 2 to n on condition that the following inequalities are satisified:

$$|H_{1(n)} + H_3 + H_M| > H_{P1} > H_{D1} > |H_{1(n-1)} + H_3 + H_M| \quad (4)$$
$$|H_{1(n-K)} + H_3 + H_M| > H_{P1} > H_{D1} > |H_{1(n-1)} + H_3 + H_M| \quad (5)$$
$$|H_{2(n)}| > H_{P2} > H_{D2} > |H_{2(n-K)}| \quad (6)$$

Figure 5:
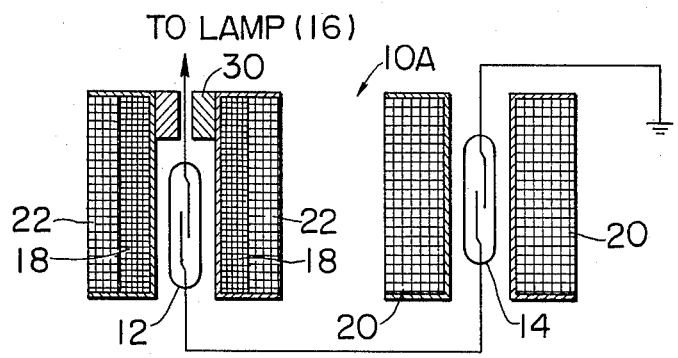
FIG. 5 is a diagram showing a partial modification of the device of FIG. 1 as another embodiment of the invention.

In the device 10A of FIG. 5, the permanent magnet 10 may be replaced by a circuit (not shown) such as a circuit including a coil and a constant-voltage diode, which can provide a magnetic field of a constant intensity regardless of variations in the output voltage of the power source 110.

Figure 7:
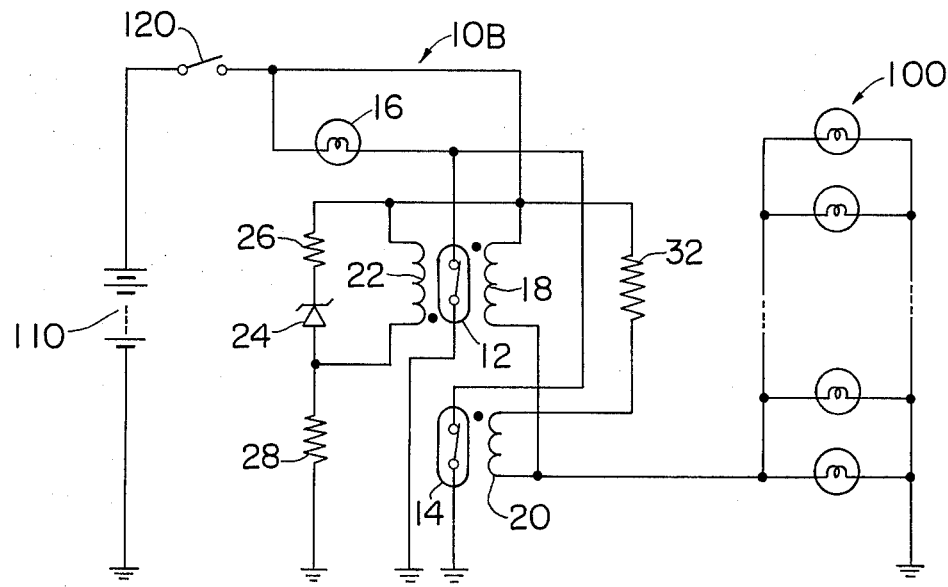
FIGS. 7–9 are diagrams of three differently constructed monitoring devices, respectively, as still different embodiments of the invention.

As a different modification of the device 10 of FIG. 1, a device 10B of FIG. 7 is designed such that the indicator lamp 16 is not lighted when none of the load lamps 100 is broken but is lighted if at least one of the lamps 100 is broken. In the device 10B the first and second reed switches 12 and 14 are connected in parallel with each other, and the first and second coils 18 and 20 also are connected in parallel with each other. A resistor 12 is connected in series with the second coil 20 so that currents may flow through the first and second coils 18 and 20 in an appropriate proportion. In other respects, the device 10B is identical with the device 10 of FIG. 1. The intensity of the magnetic field $H_3$ is determined to satisfy the inequalities (1), (2) and (3) in the same manner as in the case of the device 10. If $H_3$ is determined as shown in FIG. 3 with respect to the device 10B when $n$ is 4 and $K$ is 2, the first reed switch 12 is in the closed state only when one of the lamps 100 is broken, while the second reed switch 14 is in the closed state only when two or more lamps 100 are broken.

A monitoring device according to the invention can be constructed without using the reed switches 12 and 14 but by the use of a different switching circuit including two sets of elements of which certain characteristic is governed by the intensity of a magnetic field produced around these elements. For example, it is possible to use conventional electromagnetic relays other than reed relays. Also, a Hall effect device or a magnetoresistor is useful as the aforementioned element.

Figure 8:
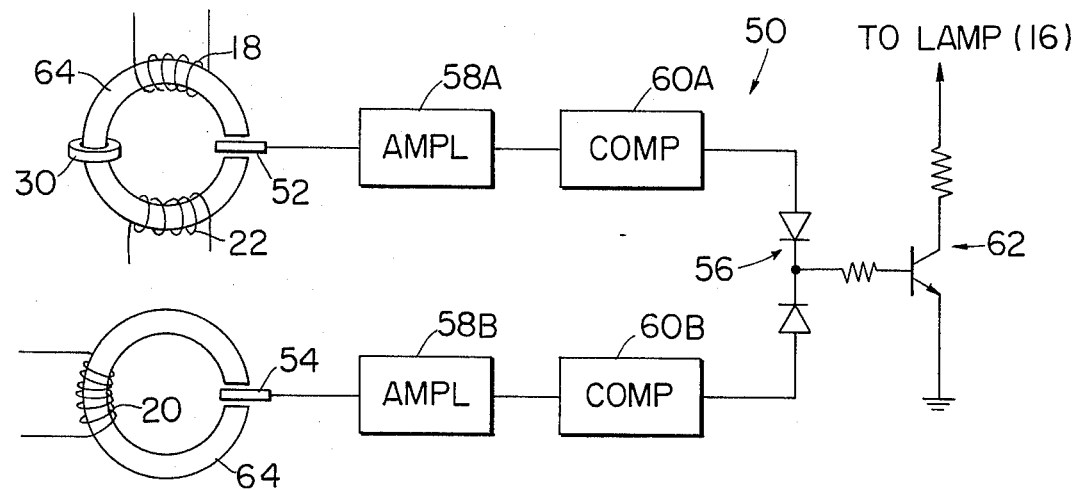

FIG. 8 shows an essential part of a monitoring device 50 in which any breaking of loads to be monitored such as the lamps 100 is indicated in the same manner as in the device 10B of FIG. 7. The first, second and third coils 18, 20 and 22 are connected as shown in FIG. 7, and the permanent magnet 30 is arranged as shown in FIG. 5. This device 50 has a first Hall effect device 52 which is arranged to be under the influence of the composite magnetic field produced by the first and third coils 18 and 22 and a second Hall device 54 which is associated with the second coil 20. The first Hall device 52 is connected to a diode OR gate 56 through a DC amplifier 58A and a comparator 60A. The second Hall device 54 is similarly connected to the OR gate 56 through a DC amplifier 58B and a comparator 60B. The device 50 includes a transistor switching circuit 62 which is arranged in the load current circuit for the indicator lamp 16 and completes this circuit upon receipt of a signal from the OR gate 56. The numeral 64 indicates usual cores of a magnetic material.

Figure 9:
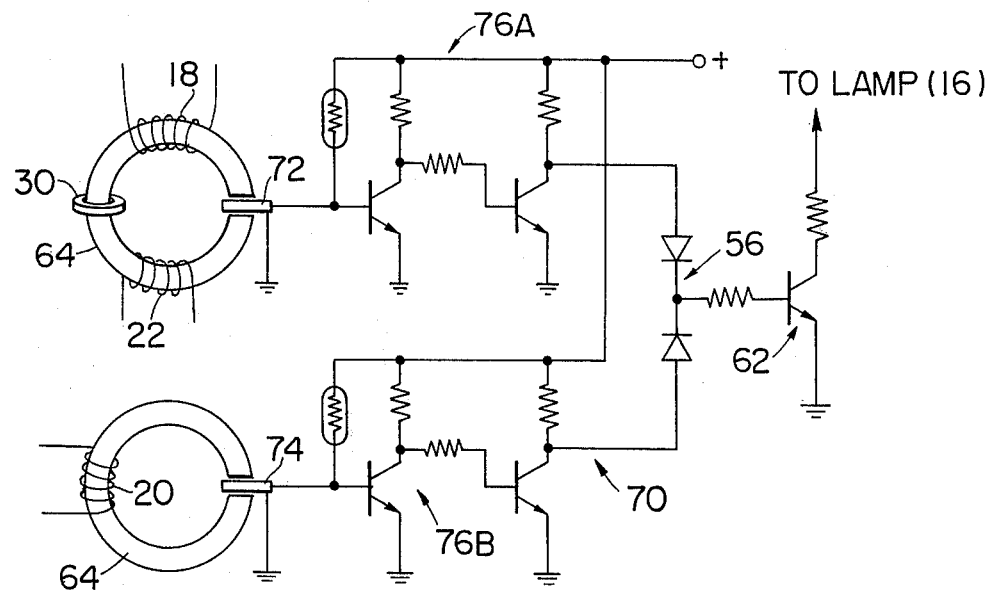

FIG. 9 shows an essential part of a still differently constructed monitoring device 70 in which any breaking of the loads such as the lamps 100 is indicated in the same manner as in the devices 10B and 50. In this device 70, the first, second and third coils 18, 20 and 22 and the permanent magnet 30 are arranged in the same manner as in the device 50 of FIG. 8. This device 70 has the OR gate 56 and the transistor switching circuit 62 like the device 50. The first and second Hall devices 52 and 54 of the device 50 are replaced respectively by a first magnetoresistor 72 and a second magnetoresistor 74, and these two magnetoresistors 72 and 74 are connected to the OR gate 56 respectively through first and second transistor amplifiers 76A and 76B. Accordingly, the function of the switching circuit 62 is governed by the output currents of the magnetoresistors 72 and 74, and these output currents are dependent on the intensities of the magnetic fields produced by the coils 18, 20 and 22.

In any one of the foregoing embodiments, a monitoring device according to the invention is based on two sets of magnetically sensitive elements which need not be of extremely high precision, but can detect and indicate the occurrence of any breaking of wire in a plurality of loads in parallel connection even when a common power source for the loads and the device exhibits a considerable fluctuation. Besides, a device according to the invention is very stable, reliable and durable even when subjected to severe mechanical and/or environmental stresses because of hardy and durable properties of the essential elements such as reed switches, Hall devices or magnetoresistors.

What is claimed is:

1. A device for detecting and indicating the occurrence of any breaking of wire in a plurality of load which are in parallel connection with each other and connectable to a DC power source, the device comprising:
   a circuit which comprises first and second coils magnetically isolated from one another and which is electrically connected in series with the power source and the loads;
   a third coil connected across the power source and arranged to produce a third magnetic field in the reverse direction to a first magnetic field produced by said first coil when the loads are connected to the power source, said third coil being arranged such that said first and third magnetic fields give a composite field;
   an electrically actuatable indicator; and
   a switching circuit arranged to supply power to said indicator, said switching circuit including first and second elements of the same type which are sensitive to variations in the intensity of a magnetic field therearound, said first and second elements being arranged to lie respectively in said composite magnetic field and in a second magnetic field produced by said second coil when the loads are connected to the power source;
   the constants of said first, second and third coils and the sensitivities of said first and second elements being regulated, when the total number of said loads is n, such that said first element is in a first state in regard to the completion of said switching circuit only when the loads are connected to the power source and the number of broken loads is in the range between 1 and $(K-1)$, where $K$ is a predetermined integer between 2 and $n$, but in a second state when the number of the broken loads is either zero or at least K, while said second element is in said first state when the loads are connected to the power source and the number of the broken loads is at least K but in said second state when the number of the broken loads is less than K, the intensity of said composite magnetic field being close to zero when the number of broken loads is K $-$ 1, thereby to cause said indicator to be in one of the actuated and non-actuated states only when the number of the broken loads is zero and in the other state when the number of the broken loads is at least one.

2. A device as claimed in claim 1, wherein said first and second elements are first and second normally open reed switches, respectively.

3. A device as claimed in claim 2, wherein said first and second reed switches are connected in series, said first and second coils being connected in series with one another.

4. A device as claimed in claim 3, further comprising a zener diode and at least one resistor in series connection, the zener voltage of said zener diode being lower than the minimum value of the output voltage of the power source, said zener diode being connected in parallel with said third coil, so that the absolute value of the intensity of said third magnetic field can be regulated close to the absolute value of the intensity of said first magnetic field.

5. A device as claimed in claim 4, wherein the sensitivities of said first and second reed switches and the intensities of said first, second and third magnetic fields satisfy the following inequalities:

$$|H_{1(n)} + H_3| > H_{P1} > H_{D1} > |H_{1(n-1)} + H_3| \quad (1)$$
$$|H_{1(n-K)} + H_3| > H_{P1} > H_{D1} > |H_{1(n-1)} + H_3| \quad (2)$$
$$|H_{2(n)}| > H_{P2} > H_{D2} > |H_{2(n-K)}| \quad (3)$$

where:
- $H_{P1}$ and $H_{P2}$ are the minimum magnetic field intensities for closing said first and second reed switches, respectively;
- $H_{D1}$ and $H_{D2}$ are the maximum magnetic field intensities for releasing said first and second reed switches, respectively;
- $H_1$, $H_2$ and $H_3$ are intensities of said first, second and third magnetic fields, respectively; and
- each of the subscripts in the parentheses represents a state where the number of the unbroken loads is as indicated in each parenthesis.

6. A device as claimed in claim 5, wherein said integer K is 2.

7. A device as claimed in claim 3, further comprising means for producing a fourth magnetic field of a constant intensity in the same direction as said third magnetic field, so that said first, third and fourth magnetic fields produce another composite magnetic field when the loads are connected to the power source, the intensity of said another composite magnetic field being close K —zero when the number of the broken loads is K— 1.

8. A device as claimed in claim 7, wherein the sensitivities of said first and second reed switches and the intensities of said first, second, third and fourth magnetic fields satisfy the following inequalities:

$$|H_{1(n)} + H_3 + H_M| > H_{P1} > H_{D1} > |H_{1(n-1)} + H_3 + H_M| \quad (4)$$
$$|H_{1(n-K)} + H_3 + H_M| > H_{P1} > H_{D1} > |H_{1(n-1)} + H_3 + H_M| \quad (5)$$
$$|H_{2(n)}| > H_{P2} > H_{D2} > |H_{2(n-K)}| \quad (6)$$

where:
- $H_{P1}$ and $H_{P2}$ are the minimum magnetic field intensities for closing said first and second reed switches, respectively;
- $H_{D1}$ and $H_{D2}$ are the maximum magnetic field intensities for releasing said first and second reed switches, respectively;
- $H_1$, $H_2$, $H_3$ and $H_M$ are intensities of said first, second, third and fourth magnetic fields, respectively; and
- each of the subscripts in the parentheses represents a state where the number of the unbroken loads is as indicated in each parenthesis.

9. A device as claimed in claim 8, wherein said means for producing said fourth magnetic field is a permanent magnet.

10. A device as claimed in claim 2, wherein said first and second reed switches are connected in parallel, said first and second coils being connected in parallel with one another, the device further comprising a resistor connected in series with said second coil.

11. A device as claimed in claim 10, further comprising a zener diode and at least one resistor in series connection, the zener voltage of said zener diode being lower than the minimum value of the output voltage of the power source, said zener diode being connected in parallel with said third coil, so that the absolute value of the intensity of said third magnetic field can be regulated close to the absolute value of the intensity of said first magnetic field.

12. A device as claimed in claim 11, wherein the sensitivities of said first and second reed switches and the intensities of said first, second and third magnetic fields satisfy the following inequalities:

$$|H_{1(n)} + H_3| > H_{P1} > H_{D1} > |H_{1(n-1)} + H_3| \quad (1)$$
$$|H_{1(n-K)} + H_3| > H_{P1} > H_{D1} > |H_{1(n-1)} + H_3| \quad (2)$$
$$|H_{2(n)}| > H_{P2} > H_{D2} > |H_{2(n-K)}| \quad (3)$$

where:
- $H_{P1}$ and $H_{P2}$ are the minimum magnetic field intensities for closing said first and second reed switches, respectively;
- $H_{D1}$ and $H_{D2}$ are the maximum magnetic field intensities for releasing said first and second reed switches, respectively;
- $H_1$, $H_2$ and $H_3$ are intensities of said first, second and third magnetic fields, respectively; and
- each of the subscripts in the parentheses represents a state where the number of the unbroken loads is as indicated in each parenthesis.

13. A device as claimed in claim 1, wherein said first and second elements are first and second Hall effect devices, respectively, said switching circuit including an OR gate arranged to receive the outputs of said first and second Hall effect devices and a transistor switching circuit arranged to govern the supply of power to said indicator in response to a signal from said OR gate.

14. A device as claimed in claim 13, further comprising a permanent magnet arranged adjacent said third coil to produce a fourth magnetic field of a constant intensity in the same direction as said third magnetic field, so that said first, third and fourth magnetic fields produce another composite magnetic field when the loads are connected to the power source, the intensity of said another composite magnetic field being close to zero when the number of the broken loads is K − 1.

15. A device as claimed in claim 1, wherein said first and second elements are first and second magnetoresistors, respectively, said switching circuit including an OR gate arranged to receive the outputs of said first and second magnetoresistors and a transistor switching circuit arranged to govern the supply of power to said indicator in response to a signal from said OR gate.

16. A device as claimed in claim 15, further comprising a permanent magnet arranged adjacent to said third coil to produce a fourth magnetic field of a constant intensity in the same direction as said third magnetic field, so that said first, third and fourth magnetic fields produce another composite magnetic field when the loads are connected to the power source, the intensity of said another composite magnetic field being close to zero when the number of the broken loads is K − 1.

* * * * *